(12) United States Patent
Seitz

(10) Patent No.: US 9,269,150 B1
(45) Date of Patent: Feb. 23, 2016

(54) USING POSE DATA AND POSITIONING INFORMATION TO LOCATE ONLINE PHOTOS OF A USER

(71) Applicant: Google Inc., Mountain View, CA (US)

(72) Inventor: Steven Maxwell Seitz, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/499,384

(22) Filed: Sep. 29, 2014

Related U.S. Application Data

(60) Provisional application No. 61/907,785, filed on Nov. 22, 2013.

(51) Int. Cl.
*G06T 7/00* (2006.01)
*G06K 9/00* (2006.01)

(52) U.S. Cl.
CPC .......... *G06T 7/0042* (2013.01); *G06K 9/00268* (2013.01); *G06K 9/00523* (2013.01); *G06T 2207/10012* (2013.01); *G06T 2207/30196* (2013.01); *G06T 2207/30244* (2013.01)

(58) Field of Classification Search
CPC ............. G06T 7/0042; G06K 9/00268; G06K 9/00523
See application file for complete search history.

(56) References Cited

U.S. PATENT DOCUMENTS

| 5,633,946 | A * | 5/1997 | Lachinski | G01C 15/00 348/118 |
| 7,796,155 | B1 * | 9/2010 | Neely, III | G06K 9/00771 345/418 |
| 7,903,001 | B2 * | 3/2011 | Sheha | G01C 21/36 340/539.13 |
| 8,930,817 | B2 * | 1/2015 | Bull | G06F 1/1632 715/730 |
| 2008/0319844 | A1 | 12/2008 | Hua et al. | |
| 2009/0190798 | A1 * | 7/2009 | Lee | G06K 9/00201 382/103 |
| 2010/0250136 | A1 * | 9/2010 | Chen | G06F 17/30247 701/300 |
| 2011/0110594 | A1 | 5/2011 | Hasegawa et al. | |
| 2012/0100867 | A1 | 4/2012 | Liang et al. | |
| 2012/0113273 | A1 | 5/2012 | Rothschild | |
| 2012/0195474 | A1 | 8/2012 | Li et al. | |
| 2013/0184988 | A1 | 7/2013 | Sheha et al. | |

OTHER PUBLICATIONS

Rahul Garg et al. Where's Waldo: Matching People in Images of Crowds. IEEE Conference on Computer Vision and Pattern Recognition (CVPR). 2011, 8 pages. [Retrieved Nov. 21, 2013]. Retrieved from the Internet: <http://vision.ics.uci.edu/papers/GargRSS_CVPR_2011/>.

* cited by examiner

*Primary Examiner* — Samir Ahmed
(74) *Attorney, Agent, or Firm* — Lerner, David, Littenberg, Krumholz & Mentlik, LLP

(57) ABSTRACT

The aspects described herein include receiving a request for available images depicting a user. One or more time and location indicators indicating one or more locations visited by the user are determined. Based on at least in part the one or more time and location indicators, a set of candidate images may be identified. The set of candidate images depict one or more locations at a time corresponding to at least one of the time indicators. Pose data related to the user may be obtained based on the location indicators. The pose data indicates a position and orientation of the user during a visit at a given location depicted in the set of candidate images. One or more images from the set of candidate images may be selected based on the pose data and the 3D reconstruction. The selected images include at least a partial view of the user.

20 Claims, 8 Drawing Sheets

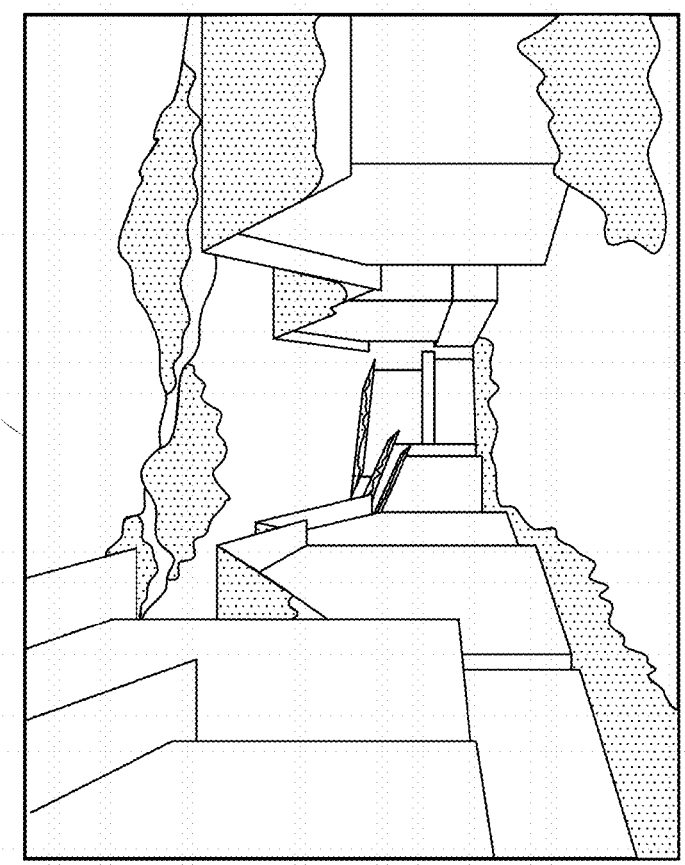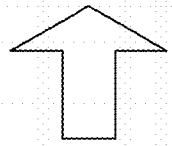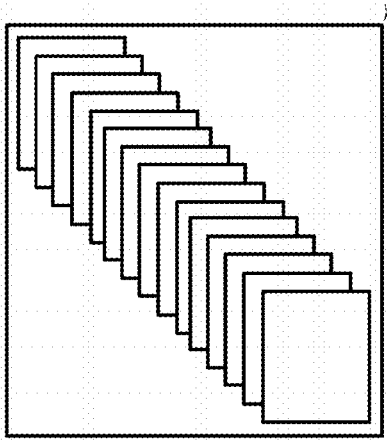
FIG. 4

FIG. 5
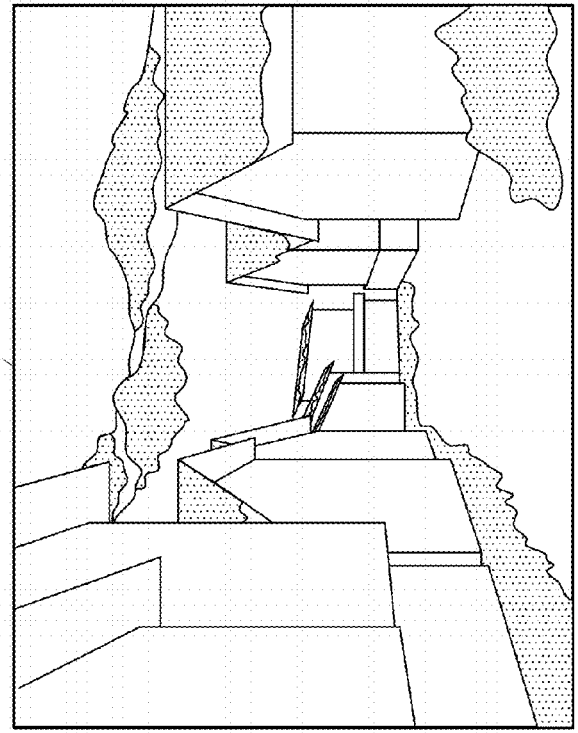
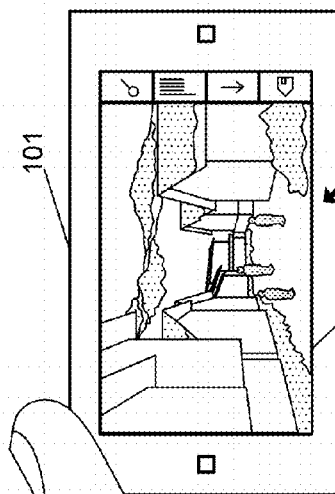

USING POSE DATA AND POSITIONING INFORMATION TO LOCATE ONLINE PHOTOS OF A USER

CROSS-REFERENCE TO RELATED APPLICATIONS

The present application claims the benefit of the filing date of U.S. Provisional Patent Application No. 61/907,785 filed Nov. 22, 2013, the disclosure of which is hereby incorporated herein by reference.

BACKGROUND

Various systems allow users to post and share photos that were taken at different geographic locations. These photos may depict objects (such as streets, buildings and people) present at the locations when the photos were captured. In many situations, these photos may capture an image of other people. For example, a photo taken at a location may capture images of various people in a background scene of the photo. Further, some of those photos may be publicly shared by the person who took the photo. Some people may want to see any images publicly shared online, which include a view of themselves. However, locating these images of a particular person can be difficult, particularly where the person is only partially depicted or is included in the background of an image.

BRIEF SUMMARY

Aspects of the disclosure may be advantageous for locating images of a user posted by others. One aspect of the present technology provides a method that includes receiving a request for available images depicting a user. The method also includes using one or more computing devices to determine one or more time and location indicators indicating one or more locations visited by the user. Based on at least in part the one or more time and location indicators, a set of candidate images are identified. The set of candidate images depict one or more locations at a time corresponding to at least one of the time indicators. Pose data related to the user is obtained based on the location indicators. The pose data indicates a position and orientation of the user during a visit at a given location depicted in the set of candidate images. One or more images from the set of candidate images are selected based on the pose data and the 3D reconstruction.

In one example, the one or more time and location indicators include at least one of: position information from a mobile computing device, coordinates associated with a certain position at a location, a user-specified location.

In another example, the method further includes comparing the pose data for the user with data representing a focal length of each image associated with the 3D reconstruction and determining whether a certain image of the one or more selected images for the particular location includes a view of the user's face based at least in part on the comparison. In this regard, position information associated with the certain image overlaps with position information associated with the pose data related to the user.

In another example, the method further includes determining whether the user is visible in the set of candidate images by estimating a distance from a given image of the set of candidate images to the user based on the 3D reconstruction.

In yet another example, selecting images from the set of candidate images includes receiving one or more facial images depicting facial features of the user and comparing the one or more facial images to objects depicted in a given image from the set of candidate images. Based on the comparison, it can be detected whether a percentage of the user's face is in the given image.

Another aspect of the present technology provides a non-transitory computer readable medium including instructions that, when executed by one or more processors, cause the one or more processors to perform a method that includes receiving a request for available images depicting a user. Using one or more processors, one or more time and location indicators indicating one or more locations visited by the user are determined. Based on at least in part the one or more time and location indicators, a set of candidate images may be identified. The set of candidate images depict one or more locations at a time corresponding to at least one of the time indicators. Pose data related to the user may be obtained based on the location indicators. The pose data indicates a position and orientation of the user during a visit at a given location depicted in the set of candidate images. One or more images from the set of candidate images may be selected based on the pose data and the 3D reconstruction.

Yet another aspect of the present technology provides a system including a memory and one or more processors coupled to the memory. The one or more processors are configured to receive a request for available images depicting a user. Using one or more processors, one or more time and location indicators indicating one or more locations visited by the user are determined. Based on at least in part the one or more time and location indicators, a set of candidate images may be identified. The set of candidate images depict one or more locations at a time corresponding to at least one of the time indicators. Pose data related to the user may be obtained based on the location indicators. The pose data indicates a position and orientation of the user during a visit at a given location depicted in the set of candidate images. One or more images from the set of candidate images may be selected based on the pose data and the 3D reconstruction.

BRIEF DESCRIPTION OF THE DRAWINGS

FIG. 4 is an illustration of a 3D reconstruction of a location in accordance with aspects of the disclosure.

FIG. 5 is an illustration of image analysis technique in accordance with aspects of the disclosure.

DETAILED DESCRIPTION

Overview

Figure 1:
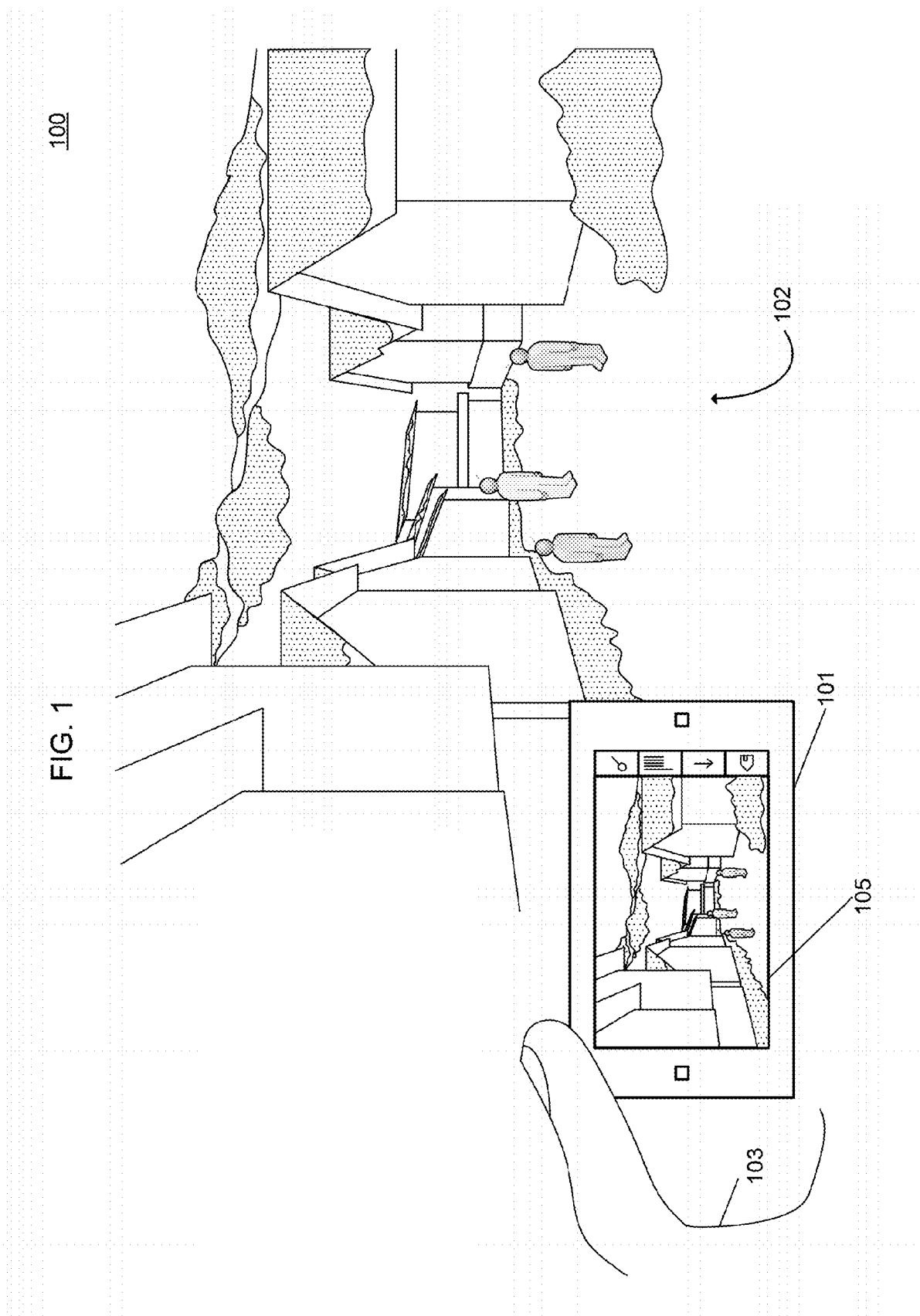
FIG. 1 is an illustration of an image capturing process in accordance with aspects of the disclosure.

The present disclosure pertains to a system for locating images (e.g., digital photos and video, which are perhaps publicly shared on the Internet) of a user that were taken at a geographic location. Others may have publicly posted these images, for example, on the Internet at various social media websites. In many situations, users may want to locate images depicting themselves that were taken by others. For instance, users visiting a popular and/or famous location and may want to see pictures including themselves at that location. Here, the users may not have taken pictures of themselves at the location because, for example, they were busy taking pictures of their family and friends. In other situations, users may want to locate images of themselves because of privacy concerns.

In some aspects, a user may subscribe to a service in which requests are made to locate images (for example, some of which are on the Internet) depicting the user. In turn, this service will notify the user when available images are found. In some embodiments, the images are shared with the user privately or the images are publicly available. Once the images are located, the users are presented with several options. In some embodiments, users can make a request or pay a fee for copies of the images, for the owners of the images to take down the images of the user, or to have the user's face blurred in the images.

To locate images of a user that may have been shared, the service, e.g., at the user's request, may determine several past locations visited by the user. For example, a location that the user visited can be determined based on one or more location indicators. These indicators may include, for example and if the user so desires, signals from the user's Global Positioning System (GPS) enabled computing device, such as a mobile phone. This computing device may provide recorded GPS time stamps indicating previous movements of the user at specific locations. In other situations, the one or more indicators can include the locations and/or times selected by the user, etc.

Based on the determined locations, a set of candidate images captured at or depicting a specific location is identified. As an example, the candidate images may be identified from a large set of images based on location information associated with these images. In order to narrow down or identify which images to include in the set of candidate images, a time indicator associated with the images may also be used. For example, the service selects candidate images depicting a location having a time indicator corresponding to a particular time that the user visited the location.

Once the set of candidate images are identified, the images may be analyzed to determine which ones include at least a partial view of the user. In this regard, pose data related to the user (e.g., information related to a position and orientation of the user's body at a location during a visit to that location) may be obtained. For example, the pose data can be obtained based on the user's GPS enabled device, which has a record of the user's movements. In some aspects, the service may be provided with specific coordinates of a location the user visited at a certain time. Based on the pose data, the user's position at the location is determined with respect to the candidate images. For example, 3D reconstructions of the location are created to determine a precise camera viewpoint of each candidate image and a geometry of the scene depicted in the images. Using the 3D reconstruction and the pose data, the user's estimated distance to each candidate image is determined in order to figure out if the user is visible in a particular candidate image.

In one aspect, a computer vision process can be used to further determine whether a user is visible in a candidate image. For example, one or more images of the user's face are received for facial recognition purposes and to match aspects of the user's face with facial features depicted in the candidate images. If a detected portion of the user's face in a given image from the candidate images meets a certain threshold level, then it is determined that the user is visible in the given image.

For situations in which the subject matter described herein collects information about users, or may make use of user-related information, the users may be provided with an opportunity to control whether programs or features collect user information (e.g., information about a user's social network, social actions or activities, profession, preferences or a user's current location), or to control whether and/or how to receive information that may be of interest to the user. In addition, certain data may be treated in one or more ways before it is stored or used, so that personally identifiable information is removed. For example, a user's identity may be treated so that no personally identifiable information can be determined for the user, or a user's current and historical location may be generalized where location information is obtained (such as to a city, ZIP code or state level), so that a particular location of a user cannot be determined. A user may also be provided with the opportunity to decide whether, and to control how, such information (such as pictures and location history) is used and stored on a user's device and by servers with which the device communicates.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example Methods

A user may activate a camera associated with a mobile computing device, such as a mobile phone, for capturing images at a location. FIG. 1 is an illustration of an image capturing process. The mobile computing device may include this camera. For instance, as shown in FIG. 1, mobile computing device 101 includes a camera (not shown) for capturing image 105 of location 102.

A typical captured image, such as image 105, includes objects (e.g., buildings, people and other background objects) present at the location 102 when the image was taken. These objects may include the user's intended targets as well as other objects and/or people that were captured, for example, in the background.

Once the camera has captured the image 105, it may be stored locally at the mobile computing device 101 and transmitted to a server. In some aspects, user 103 may utilize an application associated with the mobile computing device 103 for uploading images to a social media web site or some type of image hosting service. In some embodiments, the user may have to install the application and/or select a service in order to obtain the benefits of the techniques described herein.

The application may be downloaded onto mobile computing device 101. For example, the user 103 may select to download the application from a service associated with a server. The mobile computing device 101 may transmit a request for the application over a network and in response, receive the application from the service. The application may be installed locally at the mobile computing device 101. Alternatively, the application can be stored at the service and may be simply accessed through the mobile computing device 101, for example, via a mobile web browser.

By using the application, user 103 may publicly post or otherwise share image 105. Likewise other users may have taken pictures at location 102 at the same time as user 103 and posted/shared these images. In this regard, these images posted by other users may have also captured objects in the background which may include a view of user 103.

In one embodiment, these images which include a view of the user 103 can be located by using a service, which will search for the images. Like the application used for uploading images, the service may be installed locally at the mobile computing device 101 or run remotely from a connected server. In this regard, the aspects described herein may be performed locally at the mobile computing device 101, at a server, or a combination of both, etc.

As discussed above, users may be provided with an opportunity to control whether programs or features of the present disclosure may collect user information or to control whether and/or how to receive content that may be relevant to the user. To locate images of a user, the service may identify one or more indicators of past locations as described above.

Figure 2:
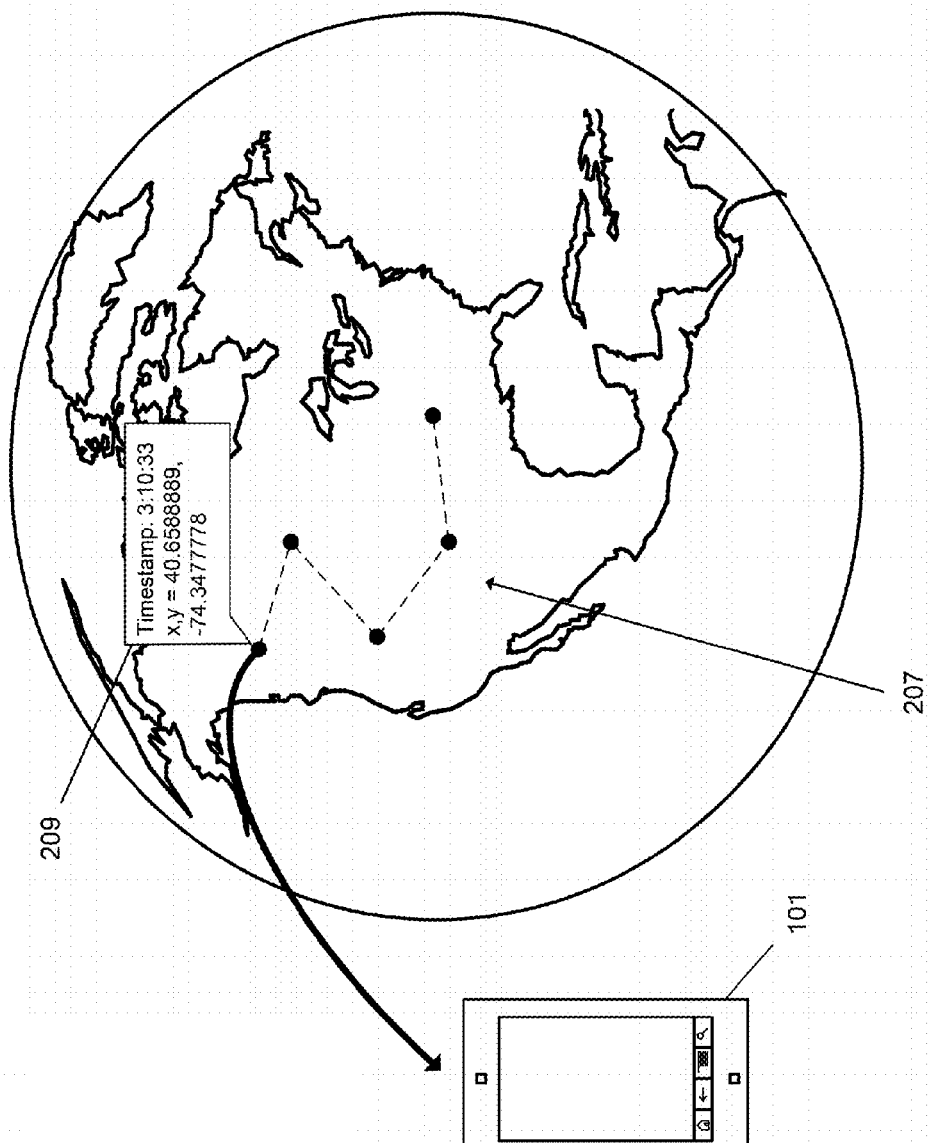
FIG. 2 is an illustration of a mobile computing device in accordance with aspects of the disclosure.

As shown in FIG. 2, the mobile computing device 101 includes geographic positioning features for recording a current location of the device. These geographic positioning features may include, for example, GPS components for identifying a current location (e.g., latitude and longitude position) of the mobile computing device 101 as it moves around a certain trajectory 207. Once the current location is identified, the mobile computing device 101 may record location information 209. The location information 209 may be recorded at set time intervals (e.g., every 30 seconds) or on demand by the user. The location information 209 includes one or more data fields, which include positioning information that indicates a global coordinate and a timestamp indicating a time when the user of device 101 was at that coordinate.

The service that is locating images of the user may identify a set of candidate images depicting a location based on the indicators. For example, the service may conduct a search for posted images taken at past locations visited by the user 103. In this regard, the images are tagged with information indicating a location depicted in the images. As discussed, these are images that were posted and possibly shared publicly on various social media sites and/or photo hosting servers.

Many of the posted images in the set may not include a view of the user. As such, the set of candidate images can be pared down by comparing them to pose data related to the user (e.g., information related to a position and orientation of the user's body at a location during a visit to that location) in order to determine which images include at least a partial view of the user.

The pose data related to the user's position and orientation at a location during a visit can be obtained by the service in several ways. For instance, the pose data can be obtained based on location information derived from the user's mobile computing device. As discussed above, the user's mobile computing device can include components, for example GPS components, that recorded a past position and orientation of the user at a certain location.

The pose data can also be obtained by the service based on a specific position the user stood on at a location at a certain time. For example, the specific position could be a popular view site at a tourist location or an indicator (e.g., foot prints on the ground) set up by a service to indicate that a user should stand there to have a picture taken to be uploaded to a central server. Once the pose data related to the user's position at a location during a visit has been obtained, this information may be compared by the service to information associated with certain images from the identified set of candidate images depicting that location.

Figure 3:
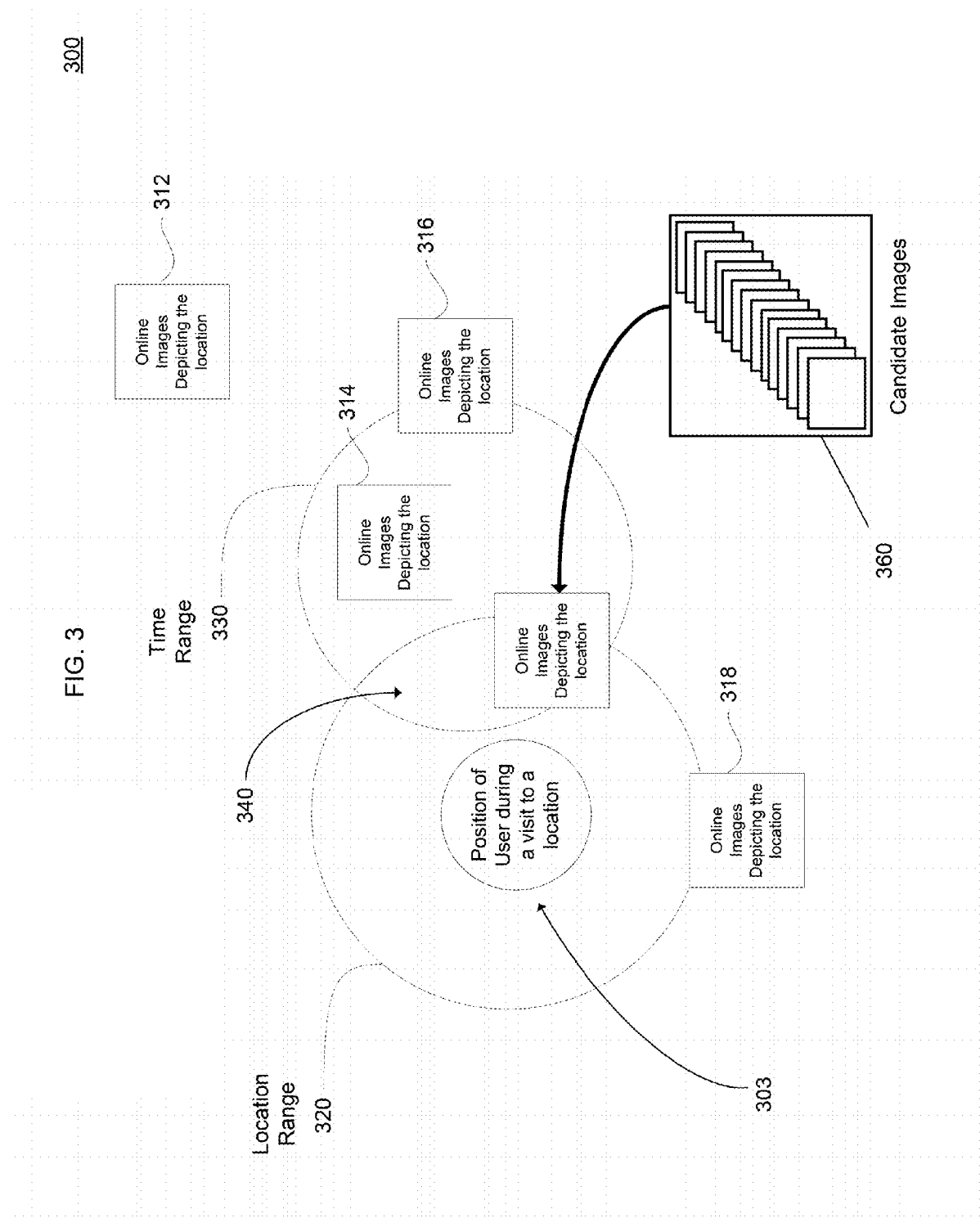
FIG. 3 is a functional diagram illustrating a number of candidate images depicting a location in accordance with aspects of the disclosure.

FIG. 3 is a functional diagram illustrating a number of images 312-318 depicting a location. As discussed above, the service may identify a past location visited by a user based on the user's GPS enabled device, such as mobile computing device 101 described with respect to FIG. 1. For example, the user's device may record the coordinates (e.g., longitude and latitude coordinates) of position 303 and a timestamp of when the user was at the positions on a past visit to a location. In turn, the service may use this information to identify the images 312-318 depicting the location. In this regard, each block of images shown in FIG. 3 may represent one or more images taken by different people at the location.

The service may employ an Internet search query to locate the images 312-318, which were taken within a predefined spatial range, such as all images within a given spatial threshold expressed in a unit of measurement (e.g., inches, feet or meters). For example, the service may search for images that were taken within 2 meters of the user's position 303. The service may determine which of the images 312-318 are within the predefined spatial range of user's position 303, for example, based on an overlapping latitude/longitude position associated with the images.

Referring to FIG. 3, the service may select certain images including images 318 and 316 that are within at least spatial range 320 of the latitude/longitude coordinates of the user's position 303. These selected images may share relevant visual data, such as views of the user's position 303 from a similar angel, orientation or evaluation level. Although other posted images 314 and 312 are not selected because they may not be within range, the spatial range 320 can be expanded to include other images if there are no images found in the initial specified range.

The images may be further refined based on a temporal range. For example, the service can determine a number of images depicting a location from a specific time period. For example, the images within temporal range 330 (e.g., images 314 and 316) may depict the location at a time corresponding to the time the user visited that location. Based on the location range 320 and temporal range 330, the service selects images located within an overlap area 340 (e.g., images 316) as candidate images 360 that may include a view of the user's position 303. For example, images in this overlap area 340 that not only are aligned with a time period in which the user visited the location, but are also geographically similar to the position of the user during that visit.

In order to figure out a precise camera viewpoint of each image in the candidate images, a 3D reconstruction of the location depicted in the images can be created. For example, in FIG. 4, a 3D reconstruction 460 of a location using candidate images 360 is shown. The candidate images 360 include a number of image projections. Each image projections may include several related images that were, for example, captured and posted by others. When the image projections are assembled using information stored with each candidate image, the 3D reconstruction 460 may be reconstructed depicting objects (e.g., people, buildings and background objects) present at the location where the images were taken. To determine whether the user is visible in a particular candidate image, the user's distance to each candidate image is estimated by analyzing the 3D reconstruction of the candidate images with respect to user pose data derived from the user's mobile computing device.

FIG. 5 is an illustration of an image analysis technique 500. In this example, by using a 3D reconstruction 460 of a set of candidate images depicting location and pose data from a user's mobile computing device 101, a user's 103 estimated distance to each candidate image (for example based on each image's focal length) is determined in order to figure out if the user 103 is visible in a particular candidate image. For example, when a photo is taken with most digital cameras, the camera embeds useful information about the photo into the photo itself. This often includes information about the focal length. The focal length can be the distance from the focal point of the camera to the vertex of a first optical surface depicted in the image. Once we have the focal length of each candidate image used to create the 3D reconstruction 460 a geometry of the scene depicted in the images can be created.

Based on the pose data related to the user's position and orientation at a location during a visit, it can be determined how visible the user is in a selected candidate image by comparing this data to the geometry. The selected candidate images are images where a view of the user may have been captured because these images depict a region of the location the covers the user's position during a visit. In order to confirm that the user is in the selected candidate images they are further analyzed using, for example, facial recognition algorithms to detect the presence of the user's facial features.

Example System

Figure 6:
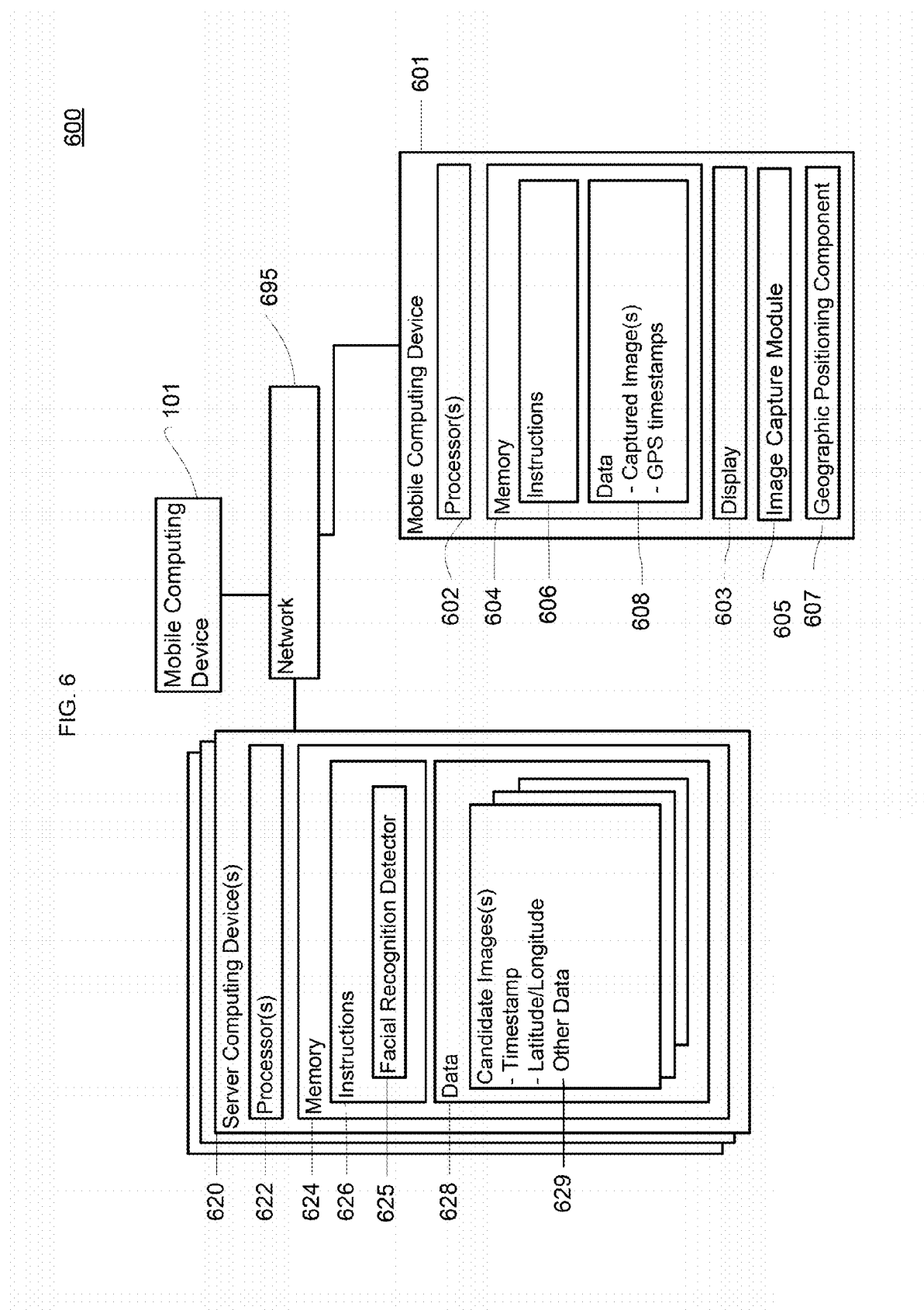
FIG. 6 is a pictorial diagram of a system in accordance with aspects of the disclosure.

FIG. 6 is a pictorial diagram of a system 600 for performing aspects of the present disclosure. As shown, the system 600 includes one or more server computing devices 620 coupled to a network 695 and a number of mobile computing devices, such as mobile computing devices 101 and 601, capable of communicating with the one or more server computing devices 620 over the network 695. The one or more server computing devices 620 may include one or more processors 622, memory 624, and other components typically present in general purpose computers.

The memory 624 of server computing device 620 may store information that is accessible by the processor 622, including instructions 626 that may be executed by the processor 622, and data 628. The memory 624 may be of a type of memory operative to store information accessible by the processor 622, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 626 and data 628 are stored on different types of media.

Although FIG. 6 functionally illustrates the processor 622 and memory 624 as being within the same block, the processor 622 and memory 624 may actually include multiple processors and memories that may or may not be stored within the same physical housing. For example, some of the instructions 626 and data 628 may be stored on removable CD-ROM and others within a read-only computer chip. Some or all of the instructions and data may be stored in a location physically remote from, yet still accessible by, the processor 622. Similarly, the processor 622 may actually comprise a collection of processors, which may or may not operate in parallel.

Data 628 may be retrieved, stored or modified by processor 622 in accordance with the instructions 626. For instance, although the present disclosure is not limited by a particular data structure, the data 628 may be stored in computer registers, in a relational database as a table having a plurality of different fields and records, XML documents, or flat files. The data 628 may also be formatted in a computer-readable format such as, but not limited to, binary values, ASCII or Unicode. By further way of example only, the data 628 may be stored as images comprised of pixels that are stored in compressed or uncompressed, or various image formats (e.g., JPEG), vector-based formats (e.g., SVG) or computer instructions for drawing graphics. For example, the data may include one or more candidate images 628, which may include information relevant to the images such as a timestamp, latitude/longitude coordinates and other data. Moreover, the data 628 may comprise information sufficient to identify the relevant information, such as numbers, descriptive text, proprietary codes, pointers, references to data stored in other memories (including other network locations) or information that is used by a function to calculate the relevant data.

The server computing device 620 may be at one node of network 695 and capable of directly and indirectly communicating with other nodes of the network 695. For example, the server computing device 620 may include a web server that may be capable of communicating with mobile computing devices 601 and 610 via network 695 such that it uses the network 695 to transmit and display information to a user on a display 603 of the mobile computing device 601. Server computing device 620 may also include a plurality of computers, e.g., a load balanced server farm, that exchange information with different nodes of a network for the purpose of receiving, processing and transmitting data to mobile computing devices 601 and 610. In this instance, the mobile computing devices 601 and 610 will typically still be at different nodes of the network 695 than the computers comprising server computing device 620.

The network 695, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD-ROM. Yet further, although some functions are indicated as taking place on a single server having a single processor, various aspects may be implemented by a plurality of servers, for example, communicating information to mobile computing devices 601 and 610 over network 695.

Each mobile computing device 601 and 610 may be configured similarly to the server computing device 620, with a processor 602, memory 604, instructions 606, data 608 and all of the internal components normally found in a personal computer. By way of example only, the mobile computing device 601 may include a central processing unit (CPU), display device 603 (for example, a monitor having a screen, a projector, a touch-screen, a small LCD screen, a television, or another device such as an electrical device that is operable to display information processed by the processor 602), CD-ROM, hard-drive, user input (not shown), such as a keyboard, mouse, touch-screen or microphone, speakers, modem and/or network interface device (telephone, cable or otherwise) and all of the components used for connecting these elements to one another.

The mobile computing device 601 may be a computing device. For example, mobile computing device 601 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single mobile computing device 601, the mobile computing device 601 may be implemented as multiple devices with both portable and non-portable components (e.g., software executing on a rack-mounted server with an interface for gathering location information).

Although the mobile computing device 601 may include a full-sized personal computer, the subject matter of the present disclosure may also be used in connection with mobile computing devices capable of wirelessly exchanging data. For example, mobile computing device 940 may be a wireless-enabled mobile computing device, such as a Smartphone, or an Internet-capable cellular phone. In either regard, the user may input information using a small keyboard, a keypad, a touch screen or other means of user input. In various aspects, the mobile computing devices and computers described herein may comprise a device capable of processing instructions and transmitting data to and from humans and other devices and computers.

The mobile computing device 601 may include a geographic positioning component 607, such as circuits, to determine a geographic location of the device 601. For example, the mobile computing device 601 may include a GPS receiver to determine the device's latitude and longitude position. As the mobile computing device 601 changes location, for example, by being physically moved, the GPS receiver may determine a new current location. In some aspects, based on the determined current location of device 601, one or more GPS timestamps may be recorded, for example, in data 608. The GPS timestamps may indicate a time and location associated with a past location visited by a user of the device 601. By way of example only, the component 607 may include software for determining the location of the device based on other signals received at the mobile computing device 601, such as signals received at a cell phone's antenna from one or more cell phone towers if the mobile computing device is a cell phone. In that regard, the provision of location identification data may occur automatically based on information received from such a component.

As shown in FIG. 6, the mobile computing device 601 may also include an image capture module 605. The image capture module 605 can be used to capture video and/or still images of an object, which can be stored in data 608. The image capture module 605 may be a software module operable in conjunction with a video camera or may include a video graphing device, such as a video digital camera having image processing components. For example, the mobile computing device 601 may be connected to a video digital camera that can operate in conjunction with the image capture module 605. The image capture module 605 can also operate in conjunction with other image capturing systems known in the arts such as a digital camera with image and/or video capture capabilities, a camera in a mobile phone, a video camera or other devices with image capturing features.

The instructions 606 of the mobile computing device 601 may be a set of instructions to be executed directly (such as machine code) or indirectly (such as scripts) by the processor. In that regard, the terms "instructions," "steps" and "programs" may be used interchangeably herein. The instructions 606 may be stored in object code format for direct processing by the processor, or in another computer language including scripts or collections of independent source code modules that are interpreted on demand or compiled in advance. Functions, methods and routines of the instructions are explained in more detail below.

In order to facilitate the operations of system 602 for locating images of a user, the server computing device 620 may further include a facial recognition detector 625 for detecting whether a portion of a user's face is in a candidate image 629. The functionally of these modules can exist in a fewer or greater number of modules than what is shown, with such modules residing at one or more computing devices, which may be geographically dispersed. The modules may be operable in conjunction with mobile computing device 601 from which it may receive captured images depicting objects present at a location and relevant information regarding those images. Thereupon, these images may be used to locate other images taken at the same location in which a user may be depicted.

Example Flow Diagrams

Techniques for locating images of a user, for example using the one or more computing device from system 600 discussed above, will now be described. The following operations do not have to be performed in the precise order described below. Rather, as mentioned above, various operations can be handled in a different order or simultaneously, and operations may be added or omitted.

Figure 7:
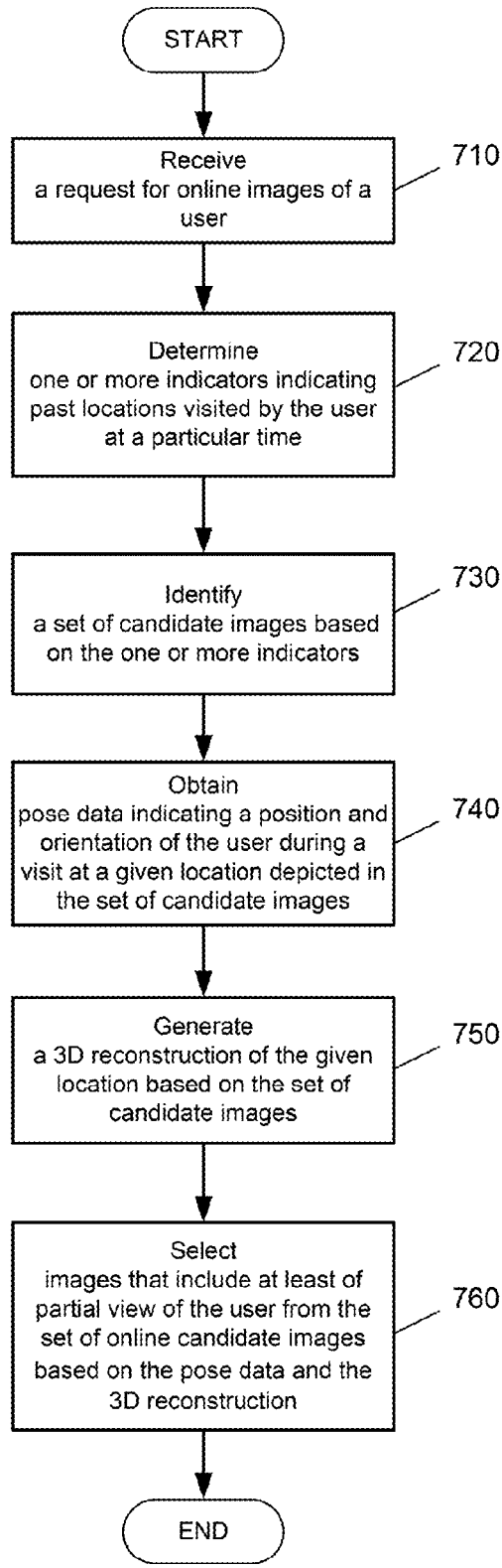
FIG. 7 is a flow diagram in accordance with aspects of the disclosure.

FIG. 7 is an example flow diagram 700 depicting an example of some of the aspects described above for locating images of a user. At block 710, a request for images of the user is received at one or more computing device. For example, a user can subscribe a service to request images of the user be located. The service will notify the user when available images are found. In some embodiments, the images are shared with the user privately or the pictures are publicly posted, for example, on a social media or photo sharing website.

At block 720, one or more indicators are determined. The indicators may indicate past locations visited by the user at a particular time. For example, these indicators can include GPS timestamps recorded on the user's mobile computing device. This device records signals indicating previous movements of the user at specific locations.

At block 730, a set of candidate images is identified based on the one or more indicators. For example, the service may employ a search query for posted images that were taken at one of the one or more past locations indicated at block 720. The images are identified based on information stored with the images indicating a location of where they were taken. In addition, a time indicator associated with the set of candidate images corresponds to one or more of the time indicators from block 720.

At block 740, pose data is obtained. The pose data indicates a position and orientation of the user during a visit at a given location depicted in the set of candidate images. In one aspect, the pose data can be obtained based on the one or more location indicators from block 720, which may be derived from the user's mobile computing device. In another aspect, the pose data can be provided based on a specific position that the user stood on at a location at a certain time.

At block 750, 3D reconstructions of the given location are generated based on the set of candidate images. For example, each candidate image identified at block 730 includes a number of image projections. Each image projections may include several related images that were, for example, captured and posted. When the image projections are assembled using information stored with each candidate image, the 3D reconstruction is reconstructed depicting objects at the location where the candidate images were taken.

At block 760, one or more images that include at least a partial view of the user is selected based on the pose data and the 3D reconstruction. For example, by using the 3D reconstruction and the pose data, the user's estimated distance to each candidate image (for example based on each image's focal length) is determined in order to figure out whether the user is visible in a particular candidate image. The selected images are further analyzed using, for example, facial recognition algorithms to confirm that the user is depicted in these images. A facial recognition technique is discussed below with respect to FIG. 8.

Figure 8:
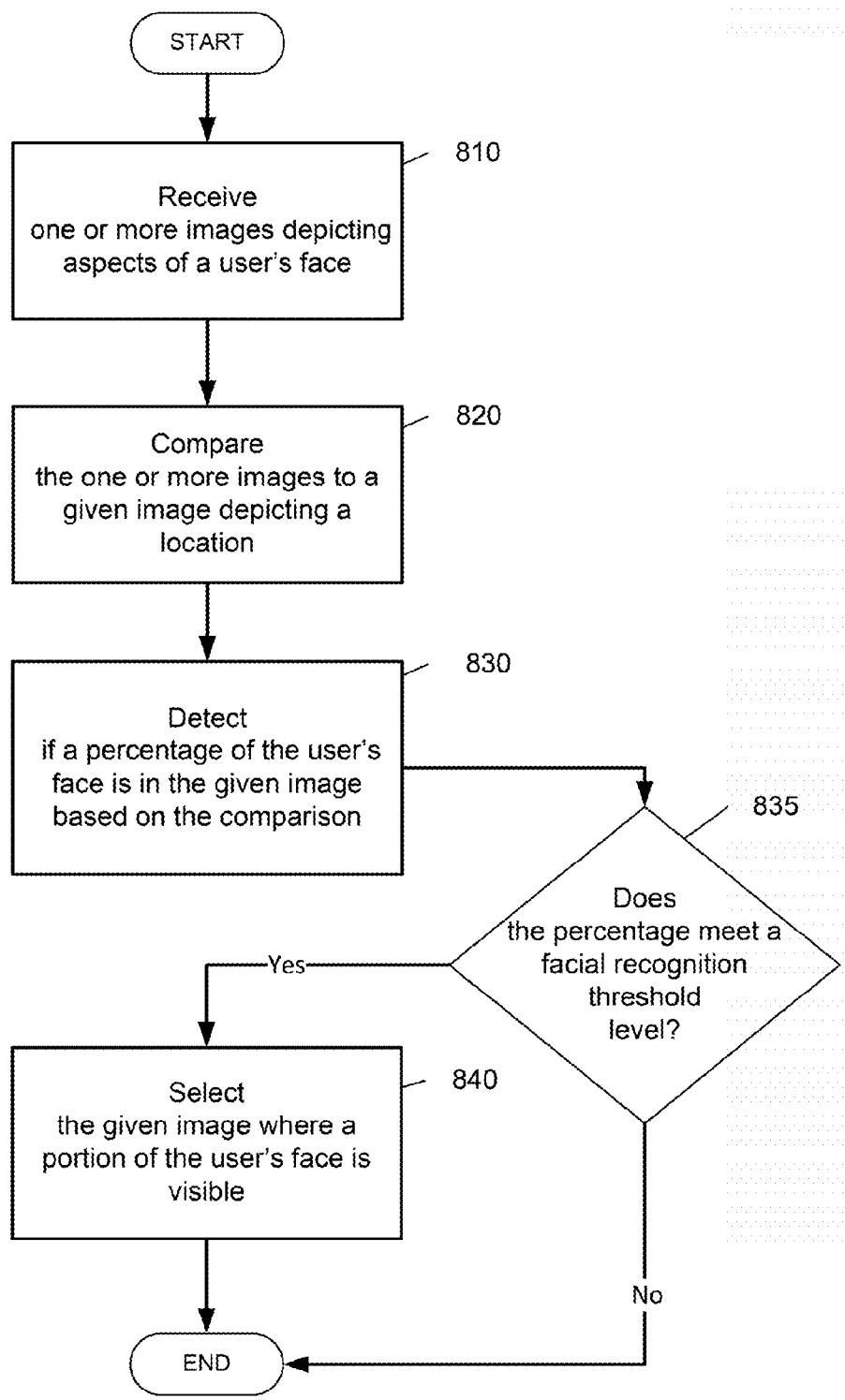
FIG. 8 is another flow diagram in accordance with aspects of the disclosure.

FIG. 8 is an example flow diagram 800 depicting an example of some of the aspects described above for detecting whether a user's facial features are in an image. At block 810, one or more images depicting aspects of a user's face are received at one or more computing device. For example, the user may use a camera embed in their mobile computing device to take one or more pictures of themselves to be uploaded to a service for locating images depicting the user. To ensure that as many aspects of the user's face are captured, the images typically will be taken with the camera being placed parallel to the user's face. However, the images can also be taken at several angles from the front and sides the user's head. The images may also be stored at a central server and identify by the user using, for example, a mouse pointer to point out aspects of the user's face.

At block 820, the one or more images are compared to a given image depicting a location. For example, the given image may be from a set of candidate images that were taken at a location at a time corresponding to the user's visit to the location. In this regard, the set of candidate images were publicly posted and/or shared with the user. A facial recognition algorithm is used to compare the one or more images of the user's face to the given image.

At block 830, it is detected whether a percentage of the user's face is in the given image from the set of candidate images based on the comparison. For example, the facial recognition algorithm employed at block 820 may determine whether aspects of the user's face received at block 810 are visible in the given image. The facial recognition algorithm may visual detect objects (e.g., one or more faces) depicted in the given image in order to match a certain percentage of the user's face with the detected objects.

At block 835, it is determined whether the percentage meets a facial recognition threshold level. In some circumstances, the user's face may not be fully captured in the given image. For example, the image may have only captured a side view of the user. Hence, the percentage of the user's face detected may be less that 100%. The threshold level may be adjusted based on empirical data to ensure that these side view images are not over looked. If the detected percentage meets a facial recognition threshold level, method 800 continues onto block 840. Otherwise, method 800 automatically stops.

At block 840, the given image where a portion of the user's face was detected is selected. For example, the user may be notified that an image has been found that depicts the user at a location. This image is then presented to the user, who may decide to pay for the image or make a request of the image owner to have the user's face blurred out.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method, comprising:
   receiving, by one or more computing devices, a request for available images depicting a user;
   determining, by the one or more computing devices, one or more time and location indicators indicating one or more locations visited by the user;
   identifying, by the one or more computing devices, a set of candidate images based on the one or more time and location indicators, the set of candidate images depicting one or more locations at a time corresponding to at least one of the time indicators;
   obtaining, by the one or more computing devices, pose data related to the user based on the location indicators, the pose data indicating a position and orientation of the user during a visit at a given location depicted in the set of candidate images;
   generating, by the one or more computing devices, a 3D reconstruction of the given location based on the set of candidate images, the 3D reconstruction representing a geometry of the given location; and
   selecting, by the one or more computing devices, one or more images from the set of candidate images based on the pose data and the 3D reconstruction, the selected one or more images including at least a partial view of the user.

2. The computer-implemented method of claim 1, wherein the one or more time and location indicators include at least one of: position information from a mobile computing device, coordinates associated a certain position at a particular location, and user-specified location.

3. The computer-implemented method of claim 1, further comprising:
   comparing the pose data for the user with data representing a focal length of each image associated with the 3D reconstruction; and
   determining whether a certain image of the one or more selected images for the particular location includes a view of the user's face based at least in part on the comparison.

4. The computer-implemented method of claim 3, wherein position information associated with the certain image overlaps with position information associated with the pose data related to the user.

5. The computer-implemented method of claim 1, further comprising determining whether the user is visible in the set of candidate images by estimating a distance from a given image of the set of candidate images to the user based on the 3D reconstruction.

6. The computer-implemented method of claim 1, wherein selecting images from the set of candidate images includes:
   receiving one or more facial images depicting facial features of the user;
   comparing the one or more facial images to objects depicted in a given image from the set of candidate images; and detecting whether a percentage of the user's face is in the given image based on the comparison.

7. The computer-implemented method of claim 6, wherein the percentage of the user's face in the given image meets a facial recognition threshold.

8. A non-transitory computer readable medium storing instructions that, when executed by one or more processors, cause the one or more processors to perform a method, the method comprising:
   receiving, by one or more processors, a request for available images depicting a user;
   determining, by the one or more computing devices, one or more time and location indicators indicating one or more locations visited by the user;
   identifying, by the one or more computing devices, a set of candidate images based on the one or more time and location indicators, the set of candidate images depicting one or more locations at a time corresponding to at least one of the time indicators;
   obtaining, by the one or more computing devices, pose data related to the user based on the location indicators, the pose data indicating a position and orientation of the user during a visit at a given location depicted in the set of candidate images;
   generating, by the one or more computing devices, a 3D reconstruction of the given location based on the set of candidate images, the 3D reconstruction representing a geometry of the given location; and
   selecting, by the one or more computing devices, one or more images from the set of candidate images based on the pose data and the 3D reconstruction, the selected one or more images including at least a partial view of the user.

9. The non-transitory computer readable medium of claim 8, wherein the one or more time and location indicators include at least one of: position information from a mobile computing device, coordinates associated with a certain position at a location, and user-specified location.

10. The computer-implemented method of claim 1, further comprising:
   comparing the pose data for the user with data representing a focal length of each image associated with the 3D reconstruction; and
   determining whether a certain image of the one or more selected images for the particular location includes a view of the user's face based at least in part on the comparison.

11. The computer-implemented method of claim 10, wherein position information associated with the certain image overlaps with position information associated with the pose data related to the user.

12. The non-transitory computer readable medium of claim 8, wherein selecting images from the set of candidate images includes:
   receiving one or more facial images depicting facial features of the user;
   comparing the one or more facial images to objects depicted in a given image from the set of candidate images; and
   detecting whether a percentage of the user's face is in the given image based on the comparison.

13. The non-transitory computer readable medium of claim 12, wherein the percentage of the user's face in the given image meets a facial recognition threshold.

14. A system, comprising:
   memory; and
   one or more processors coupled to the memory, the one or more processors being configured to:
   receive a request for available images depicting a user;
   determine one or more time and location indicators indicating one or more locations visited by the user;
   identify a set of candidate images based on the one or more time and location indicators, the set of candidate images depicting one or more locations at a time corresponding to at least one of the time indicators;
   obtain pose data related to the user based on the location indicators, the pose data indicating a position and orientation of the user during a visit at a given location depicted in the set of candidate images;
   generate a 3D reconstruction of the given location based on the set of candidate images, the 3D reconstruction representing a geometry of the given location; and
   select one or more images from the set of candidate images based on the pose data and the 3D reconstruction, the selected one or more images including at least a partial view of the user.

15. The system of claim 14, wherein the one or more time and location indicators include at least one of: position information from a mobile computing device, coordinates associated with a certain position at a location and user-specified location.

16. The computer system of claim 14, wherein the one or more processors are further configured to:
   compare the pose data for the user with data representing a focal length of each image associated with the 3D reconstruction; and
   determine whether a certain image of the one or more selected images for the particular location includes a view of the user's face based at least in part on the comparison.

17. The computer system of claim 16, wherein position information associated with the certain image overlaps with position information associated with the pose data related to the user.

18. The system of claim 14, wherein the one or more processors are further configured to determine whether the user is visible in the set of candidate images by estimating a distance from a given image of the set of candidate images to the user based on the 3D reconstruction.

19. The system of claim 14, wherein to select images from the set of candidate images the one or more processors a further configured to:
   receive one or more facial images depicting facial features of the user;
   compare the one or more facial images to objects depicted in a given image from the set of candidate images; and
   detect whether a percentage of the user's face is in the given image based on the comparison.

20. The system of claim 19, wherein the percentage of the user's face in the given image meets a facial recognition threshold.

* * * * *